(12) United States Patent
Cesak

(10) Patent No.: US 7,182,271 B2
(45) Date of Patent: Feb. 27, 2007

(54) APPARATUS AND METHOD FOR DETECTING LIQUID FLOW FROM A SPRAY DEVICE

(75) Inventor: James Cesak, Westchester, IL (US)

(73) Assignee: Spraying Systems Co., Wheaton, IL (US)

( * ) Notice: Subject to any disclaimer, the term of this patent is extended or adjusted under 35 U.S.C. 154(b) by 197 days.

(21) Appl. No.: 10/986,580

(22) Filed: Nov. 12, 2004

(65) Prior Publication Data

US 2006/0102741 A1 May 18, 2006

(51) Int. Cl.
*A01G 27/00* (2006.01)
*B05C 11/00* (2006.01)

(52) U.S. Cl. .......................... 239/67; 239/68; 239/69; 239/71; 239/11; 118/669; 118/685; 118/676; 73/861.357

(58) Field of Classification Search .............. 239/67, 239/68, 69, 71, 74, 11; 118/669, 676, 682, 118/685, 686, 713, 313, 316; 73/1.65, 1.42, 73/39.01, 861.357, DIG. 11
See application file for complete search history.

(56) References Cited

U.S. PATENT DOCUMENTS

| | | | | |
|---|---|---|---|---|
| 5,180,921 A | * | 1/1993 | Moreau et al. ............. 250/554 |
| 5,561,527 A | * | 10/1996 | Krone-Schmidt et al. ... 356/414 |
| 6,153,253 A | * | 11/2000 | Affeldt et al. ................. 427/8 |
| 6,192,882 B1 | * | 2/2001 | Gonda ................... 129/203.21 |
| 6,443,365 B1 | * | 9/2002 | Tucker et al. ................. 239/69 |
| 6,785,400 B1 | * | 8/2004 | Farina ........................ 382/100 |
| 6,806,949 B2 | * | 10/2004 | Ludviksson et al. .......... 356/72 |
| 7,063,747 B2 | * | 6/2006 | Lastowka .................... 118/669 |
| 2004/0217189 A1 | * | 11/2004 | Regli .......................... 239/69 |

FOREIGN PATENT DOCUMENTS

JP          57180464 A   *  11/1982

* cited by examiner

*Primary Examiner*—Kevin Shaver
*Assistant Examiner*—James S. Hogan
(74) *Attorney, Agent, or Firm*—Leydig, Voit & Mayer, Ltd.

(57) ABSTRACT

A flow sensor for detecting liquid flow generated by a spray device is non-invasive and capable of responding to rapid changes in the flow. The flow sensor includes a light emitter and a light detector, which may be disposed adjacent the liquid outlet of the spray device and oriented such that a light beam projected by the light emitter is aimed at the spray generated by the spray device and reflected by the spray into the light detector. The light detector senses the reflected light and generates an output indicative of the presence of the flow from the spray device. A deviation of the spray from the intended spray axis may also be detected.

21 Claims, 5 Drawing Sheets

APPARATUS AND METHOD FOR DETECTING LIQUID FLOW FROM A SPRAY DEVICE

FIELD OF THE INVENTION

This invention pertains generally to spraying systems for spraying fluids, and more particularly to an apparatus and method for detecting the liquid flow ejected by a spray device.

BACKGROUND OF THE INVENTION

Spray devices, such as spray guns, for spraying liquids are commonly used in various industrial applications. To ensure the proper operation of a spray device, it is often necessary to monitor the flow generated by the spray device. Presently, there are applications that require rapid detection of the liquid flow generated by a spray device, and in many systems the spray device is required to guarantee that the liquid is actually sprayed when demanded by the system. For instance, in the food processing industry, spray devices are widely used to add ingredients or coating to a product. If the liquid is not sprayed on the product as programmed, significant product loss or defects can occur. Moreover, many applications use spray devices that are operated at high speed, i.e., they are turned on and off rapidly. The ability to accurately detect the flow in the high speed operation is needed to ensure the proper operation of the spray device.

In the past, different methods based on different detection principles have been used to detect liquid flows. For example, a mechanical flow device may employ pistons with magnets and reed switches, sight glass, paddle, paddle wheel, gear, or other detection mechanism. Generally, all of those flow detection devices have to be inserted in the liquid line in order to function. In other words, the flow detection is invasive because the liquid being sprayed has to come into contact with the flow sending mechanism. This can cause various issues with the reliability of the flow sensor. Most flow sensors are fluid dependent and are affected by the physical properties of the fluid, such as viscosity, specific gravity, opacity, temperature, etc., and thus have to be properly selected according to the particular liquid to be detected. Because different types of liquids may be sprayed in an application, different flow sensor technologies may be required to properly detect flows in the application, resulting in a complicated system that is difficult to set up and expensive to maintain. Moreover, insertion-type flow detectors typically are for steady-state measurements and do not have a sufficiently fast response. As a result, they are not well-suited for monitoring the flow of a spray device that is operated at a high-speed to go through rapid on-off cycling.

BRIEF SUMMARY OF THE INVENTION

In view of the foregoing, it is an object of the invention to provide an apparatus and method for detecting the flow from a spray device that is capable of detecting rapid on-off cycling of the spray device.

It is a related object of the invention to provide an apparatus and method that is capable of detecting the flow from a spray device in a high-speed operation and does not depend on the physical properties of the liquid being sprayed.

It is a further related object of the invention to provide an apparatus and method for flow detection as mentioned above that is also non-invasive, i.e., it does not have to be inserted into the liquid line.

In accordance with the above objects, the present invention provides an apparatus and method for detecting liquid flow generated by a spray device that is non-invasive and capable of responding to rapid changes in the flow when the spray device is undergoing high-speed on-off cycling. In accordance with the invention, the flow detection is by means of optical sensing, which is non-invasive. The flow sensor includes a light emitter and a light detector. The sensor may be disposed adjacent to the liquid outlet of the spray device and oriented such that the light emitter is aimed at the spray generated by the spray device, and the light projected by the light emitter is reflected by the spray into the light detector. The light detector senses the reflected light and generates an output indicative of the existence of the flow from the spray device.

Additional features and advantages of the invention will be apparent from the following detailed description of illustrative embodiments which proceeds with reference to the accompanying figures.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

Figure 1:
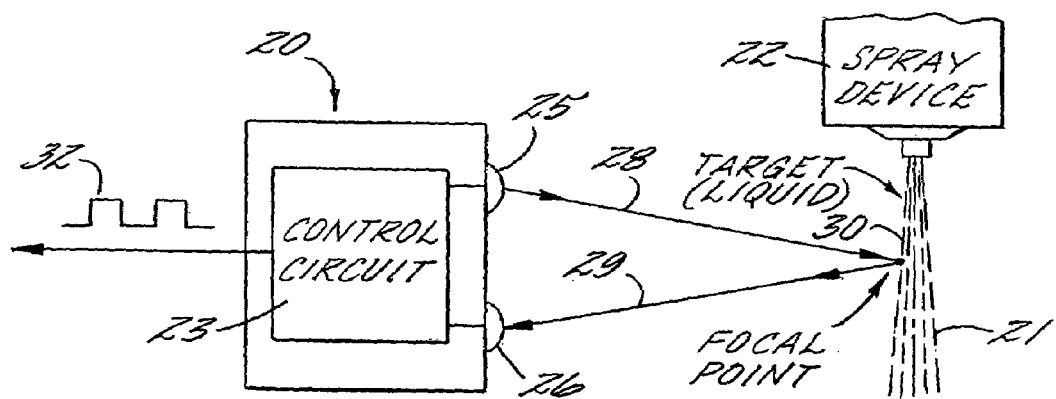
FIG. 1 is a schematic view of a flow sensor in accordance with the invention that is disposed for measuring a liquid flow generated by a spray device.

Turning now to the drawings, in which like numbers are used to refer to similar elements, FIG. 1 shows a flow sensor 20 used to detect a spray of liquid generated by a spray device 22, which may be, for instance, a high pressure spray nozzle turned on and off at a high speed. In accordance with the invention, the flow sensor 20 has a light emitter 25 and a light detector 26. The light emitter 25 may be, for example, a light emitting diode or a solid state laser, and the light detector 26 may be a photo transistor. Other types of compact light emitting devices and light detecting devices may be used. The light sensor 20 is disposed and oriented such that the light 28 generated by the light emitter 25 is reflected by the surface 30 of the spray 21, and reflected light 29 is directed towards the light detector 26. The detection of the reflected light 29 by the light detector 26 indicates that a flow is present. Based on whether the light detector receives the reflected light, the flow sensor 20 generates a signal 32 indicating whether the presence of a flow is detected.

Figure 2A:
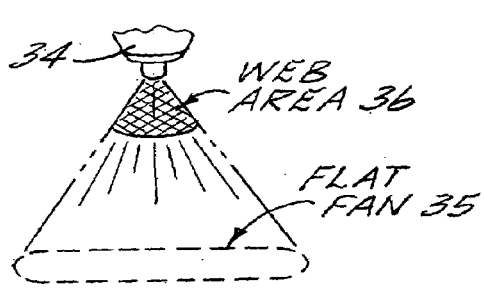
FIGS. 2A–C are schematic diagrams showing three different spray patterns and the regions in the spray patterns that provide a reflective surface that may be use for optical sensing.
Figure 2B:
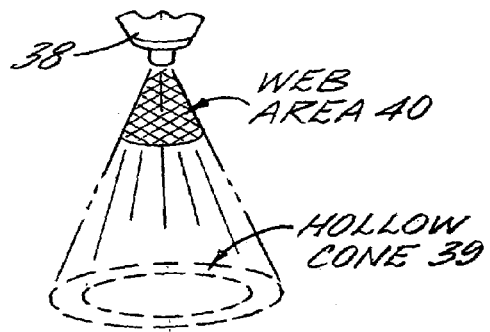
Figure 2C:
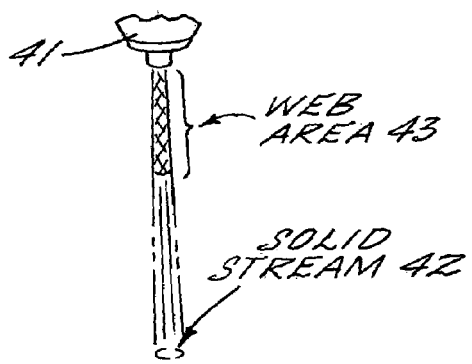

The present invention is based on the observation that when a liquid is sprayed from a spray device the liquid often forms a continuous web in the region adjacent to the outlet of the spray device. For purposes of illustration, FIGS. 2A–C show three different spray patterns. In FIG. 2A, the nozzle 34 generates a flat fan 35 of liquid. In the region right outside the spray nozzle, the liquid forms a continuous web 36, which is illustrated generally as the cross-hatched region. In contrast, the liquid in the spray further away from the nozzle may be in the form of droplets instead of a continuous web. The web 36 of liquid adjacent the spray nozzle 34 provides a reflective surface that may be used by the flow sensor according to the invention to detect the presence of the spray 35. FIG. 2B shows a nozzle 38 that generates a spray 39 in the shape of a hollow cone. The liquid forms a web 40 in the region adjacent the outlet of the nozzle, which may be used in the optical sensing of flow detection. As another example, the nozzle 41 in FIG. 2C generates a beam 42 of fluid. Even though this spray pattern is different from the ones shown in FIGS. 2A and 2B, the liquid beam nevertheless provides a web section 43 that may be used for optical sensing in accordance with the invention. It will be appreciated that three spray patterns in FIGS. 2A–C are only shown as examples, and the optical flow detection of the invention is not limited to these three spray patterns and may be used with other spray patterns.

Figure 3:
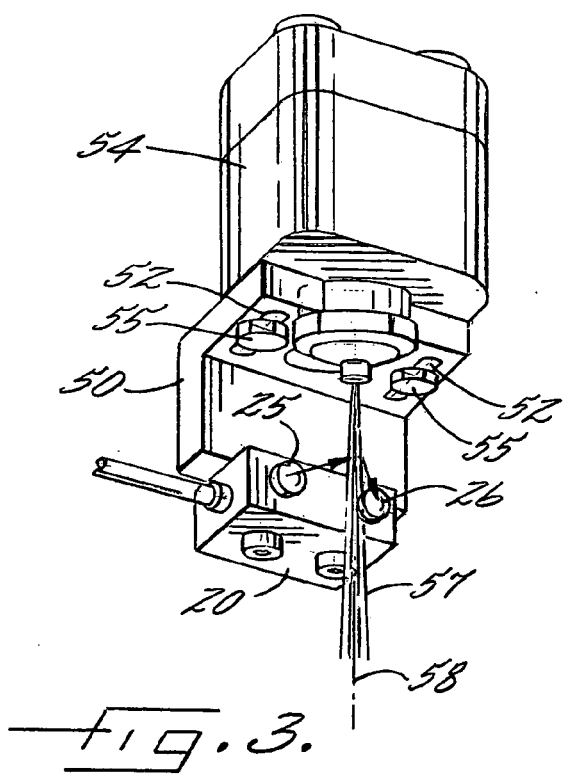
FIG. 3 is a partially schematic perspective view of a spray gun and a flow sensor mounted adjacent the spray generated by the spray gun.
Figure 4:
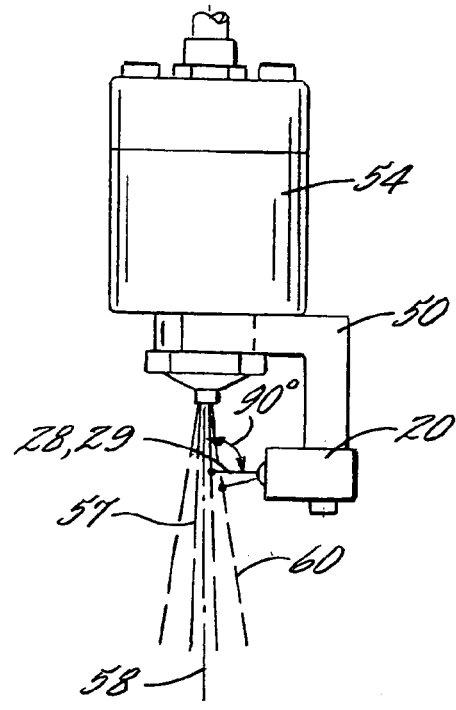
FIG. 4 is a partially schematic side view of the spray gun and the flow sensor.

To facilitate alignment of the flow sensor 20 with the liquid web surface of the spray, the flow sensor is preferably mounted on a mechanical support that allows easy position adjustment. In the embodiment shown in FIG. 3, the flow sensor 20 is mounted on an L-shaped support bracket 50 that has elongated slots 52 in one side. The bracket 50 is fastened to a spray gun 54 by screws 55 that go through the elongated slots 52. The slots 52 allow the position of the bracket 50 relative to the spray axis 58. To find the proper operation position of the flow sensor, the screws 55 are loosened to allow the bracket 50 to be moved by hand back and forth relative to the spray axis 58. This allows the position of the flow sensor 20 to be moved around until the light generated by light emitter 25 is reflected by the spray 57 into the light detector 26, as indicated by the output signal of the flow sensor 20. In the embodiment shown in FIG. 3, the flow sensor 20 is mounted such that light emitter 25 and light detector 26 are in a plane perpendicular to the axis 58 of the spray. As illustrated in FIG. 4, when the spray gun 54 is oriented to generate a downward vertical spray 57, the light emitter and light detector are disposed in a horizontal plane, with the light beams 28, 29 oriented at a 90 degree angle to the reflective surface of the spray 57. In the illustrated embodiment, the spray 57 is a liquid beam (or a flat fan looking from the side), and the light beam is in the horizontal plane. If the spray is a hollow cone as indicated by the dashed lines 60, the flow sensor 20 may be mounted such that the light beam is tilted at an angle from the horizontal plane so that it will be reflected by the surface of the conical spray back into the light detector.

Figure 5:
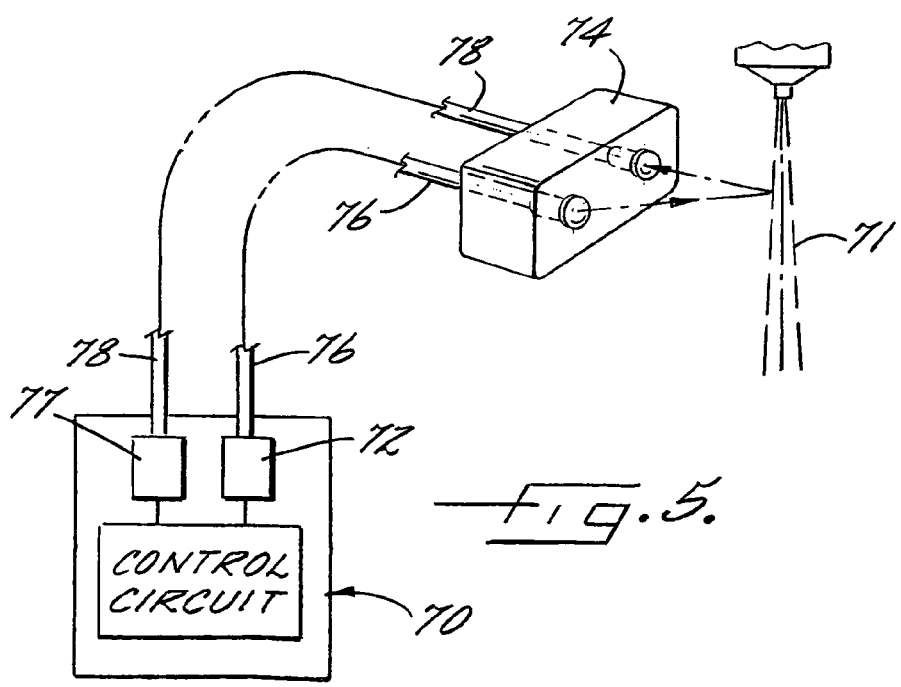
FIG. 5 is a schematic view of an alternative embodiment of a flow sensor.

Returning to FIG. 1, to provide flexibility of installation in various environments, the flow sensor 20 preferably includes the electronic circuitry 23 to operate the light emitter 25 and light detector 26, and to generate an electrical output signal 32 indicating whether a flow is detected. The integral construction allows the flow sensor 20 to be mounted on or adjacent the spray device close to the spray. Alternatively, as shown in FIG. 5, in an alternative embodiment, the flow sensor 70 may be located at a place remote from the spray 71. The light generated by the light emitter 72 is coupled to a head block 74 mounted adjacent the spray 71 via an optical fiber 76. The reflected light is collected and coupled to the light detector 77 in the flow sensor 70 by another optical fiber 78.

One advantage of the flow sensor of the invention is that it is non-invasive. Since the flow detection is done by optical means, it does not require the insertion of any component into the liquid line and thus would not impede or disturb the liquid flow. The operation of the flow sensing does not depend on the properties of the liquid, such as viscosity, specific weight, temperature, etc., and will work as long as the spray has a region with a relatively stable reflective surface. Another advantage of the flow sensor of the invention is the fast detection allowed by the optical sensing. In some applications, the spray gun may be electrically operated to go through fast on-off cycling and may have turn-on and turn-on times as fast as 5 milliseconds. Such a fast on-off cycle presents problems for conventional flow detectors of the insertion type. The flow sensor of the invention based on optical sensing, however, can easily handle turn-on and turn-off times of less than, for example, 1 millisecond.

Figure 6:
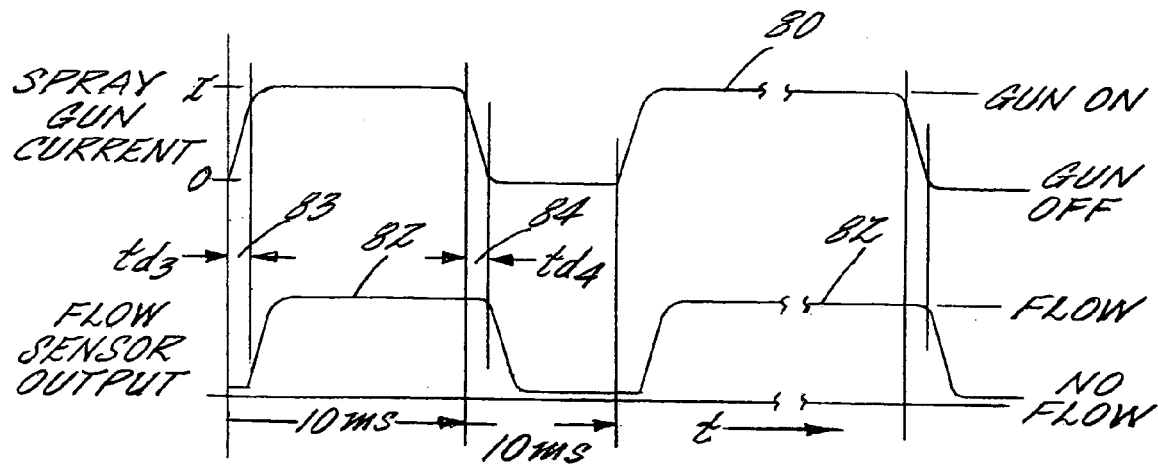
FIG. 6 is a diagram showing exemplary wave forms of the electrical current used to operate a spray nozzle and the output signal generated by the flow sensor in response the detection of the flow generated by the spray nozzle.

By way of example, FIG. 6 shows exemplary waveforms of the electrical current operating the spray gun and the output signal of the flow sensor. In this example, the spray gun goes through repeated on-off cycling. The wave form 80 of the gun current resembles a series of square waves. When the gun current is zero, the spray gun is off, and there is no spray. When the gun current is turned on, the spray gun begins to spray liquid, and spray is detected by the flow sensor, as shown in the wave form 82 of the sensor output signal. Since it takes some time for the spray to build up after the spray gun is turned on, the rise in the sensor output signal 82 may lag behind the gun current by a small time interval 83. Similarly, the spray may continue for a small amount of time after the spray gun is turned off, and the fall of the flow sensor output signal 82 may lag behind the gun current signal 80 by another small time interval 84.

Figure 7:
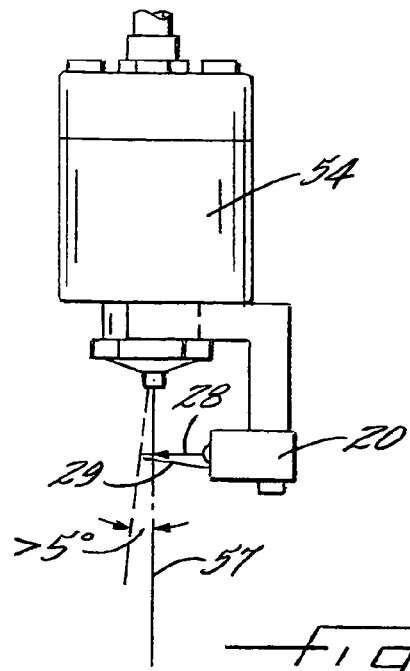
FIG. 7 is a partially schematic side view of the spray nozzle and the optical sensor in the scenario that the spray deviates from the intended spray axis.

In addition to being able to detect the rapid changing flow, the flow sensor in accordance with the invention may be used to sense whether the spray device is operating properly. By way of example, in the embodiment shown in FIG. 7, the spray gun 54 generates a downward spray with a vertical spray axis 57 during normal operation, and the light beam 28 generated by the light emitter 25 of the flow sensor 20 is oriented perpendicular to the spray axis. If for some reason the spray axis is changed or the spray wiggles or wobbles away from the intended spray axis, the light beam 29 is no longer reflected back into the light detector of the flow sensor 20. Depending on the design of the light detector and the distance from the spray, variations in the spray orientation greater than a certain angle, such as 5 degrees, may prevent the light 29 from being received of the light detector. Thus, when detecting a spray, the flow sensor 20 may be used to determine whether the spray wiggles back and forth in orientation. This would indicate that the nozzle of the spray gun 54 may be defective or is plugged up. The detection of the off-axis or wiggling spray may provide alarms for preventive maintenance of the spray device.

Figure 8:
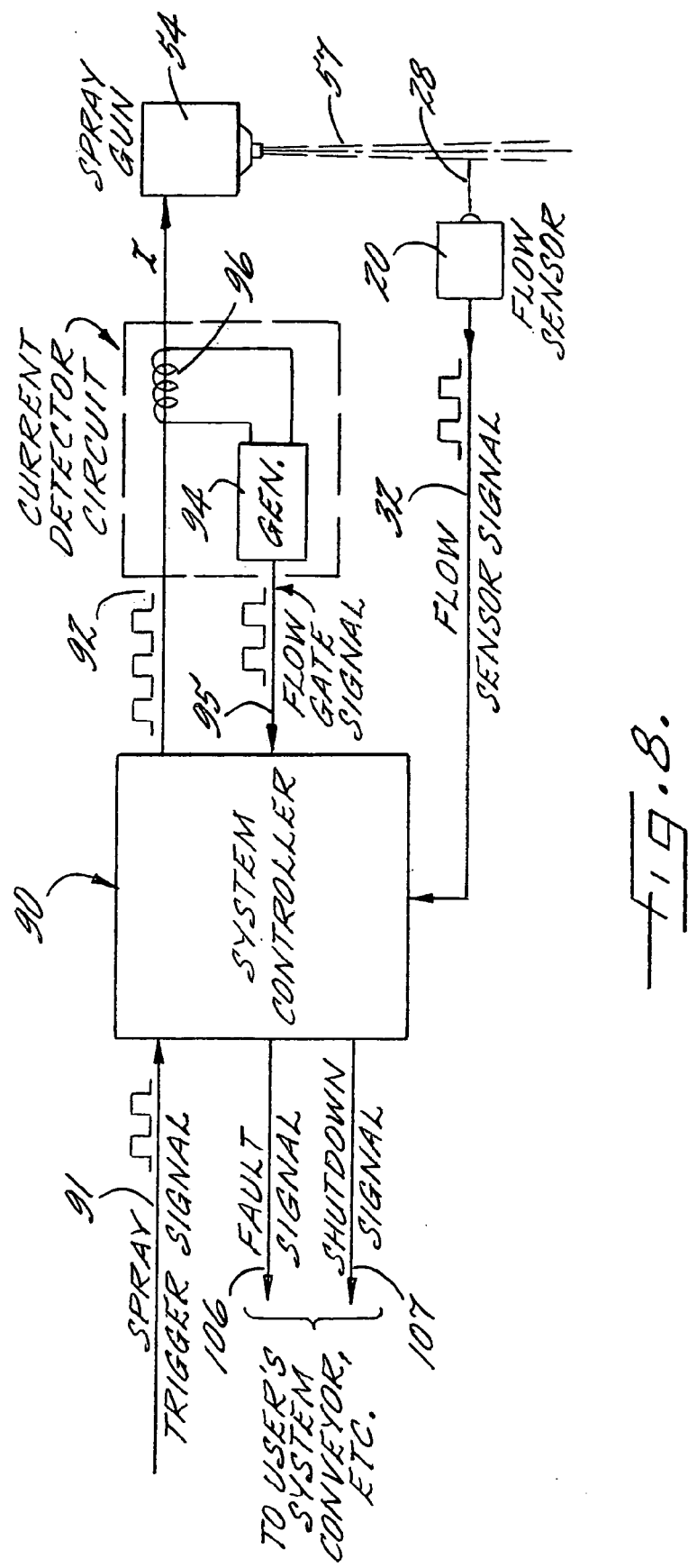
FIG. 8 is schematic diagram showing an embodiment of a spray system with a system controller that uses the flow sensor to detect flow from the nozzle.
Figure 9:
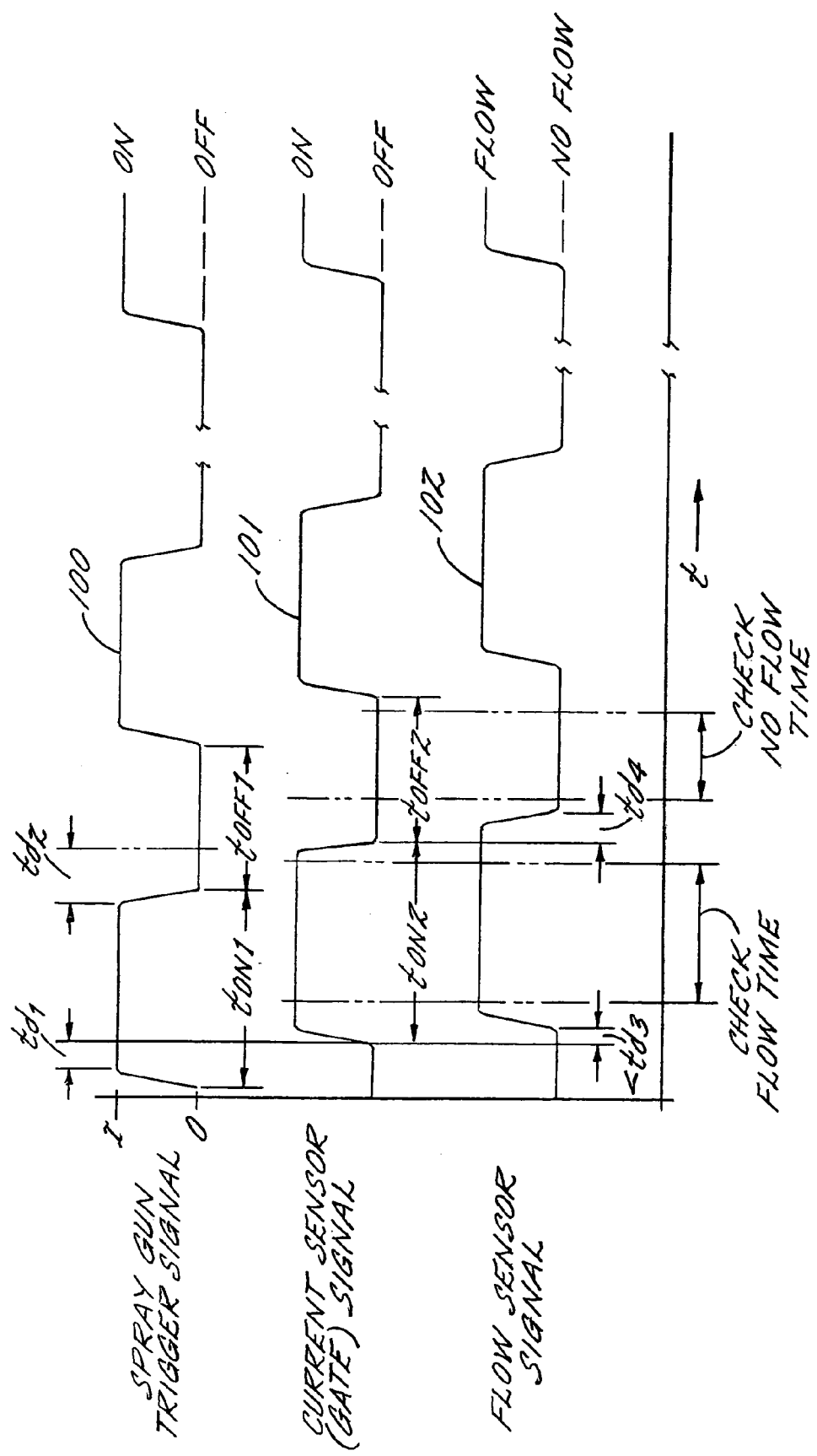
FIG. 9 is a schematic diagram showing exemplary waveforms of a gun trigger signal, a gate signal generated by sensing the gun current, and the flow sensor signal.

To enable accurate determination of whether the spray device is operating properly, the output signal 32 of the flow sensor 20 is preferably analyzed together with the control signals of the spray gun. As show in FIG. 8, in one embodiment, a spray system controller 90 receives a spray trigger signal 91 and in response sends a current 92 to turn the spray gun 54 on to begin ejecting a spray. The spray 57 is detected by the flow sensor 20 when the light beam 28 is reflected by the spray. The output signal 32 of the flow sensor 20 is sent to the system controller 90 for analysis. To accurately determine when the spray gun 54 is turned on and off, a gate signal generator 94 is used to provide a gate signal 95 corresponding to the on-off transitions of the spray gun. To that end, in the illustrated embodiment, a current sensing device such as a pick-up coil 96 is used to detect when the gun current 92 is switched on and off. The gate signal 95 is also sent to the system controller 90 for analysis. Once the spray gun 54 is turned on and actual spraying begins, the flow sensor 20 detects the spray 57 if the spray is on axis, and generates the output signal 32 indicating the presence of the spray. The reason why the current sensing device is used to provide the gate signal 95, rather than using the trigger signal 91 directly, is that the turn-on and turn-off of the spray gun may not coincide with the trigger signal for a variety of reasons. The gate signal 95 generated from sensing the gun current reflects more accurately the actual time the gun is turned on or off and thus provides more accurate flow sensing. To illustrate this point, exemplary wave forms 100, 101, and 102 of the spray trigger signal, the gate signal generated by the current sensor, and the flow sensor signal, respectively, are shown in FIG. 9.

The system controller 90 is programmed to compare the gate signal 95 and the flow sensor signal 32 to determine whether the spray gun 54 is working properly. When the spray gun 54 is turned on and off as indicated by the gate signal, the flow sensor signal 32 should follow the gate signal 95 with some small delay intervals. If this is the case, the system controller knows that spray gun 54 is functioning properly. If, however, the flow sensor signal 32 does not follow the gate signal 95, the system controller 90 determines that the spray gun 54 is not operating properly. For instance, if the gate signal 95 goes to a high level (i.e., the gun current is on) but the flow sensor signal 32 stays at a low level, either there is no spray or the spray is off-axis. If the gate signal 95 is up and the flow sensor signal 32 is intermittent, the spray may be wiggling about the spray axis. In either case, the system controller 90 issues a fault message signal 106 and may issue a shutdown signal 107 as necessary for safe system operation and prevent product loss.

It will be appreciated that a new apparatus and method for detecting liquid flow generated by a spray device capable of non-invasive high-speed operations has been disclosed herein. In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit the invention. Therefore, the invention as described herein contemplates all such embodiments as may come within the scope of the following claims and equivalents thereof.

What is claimed is:

1. A spray system comprising:
   a spray device for generating a spray of liquid into an open environment; and
   a flow sensor having a light emitter and a light detector, the flow sensor being disposed such that a light beam generated by the light emitter is directed at a reflective surface of the spray while the spray is in the open environment prior to impacting an article or other surface to create a reflected light beam, a light detector positioned for detecting only the reflected light beam and not the light emitted from the light emitter that is not reflected, and said flow sensor being operable for generating a flow detection signal in response to the reflected light beam for indicating a presence of the spray in the open environment when the light detector detects the reflected light beam.

2. A spray system as in claim 1, furthering comprising a mounting device mechanically coupled to the spray device, wherein the flow sensor is mounted on the mounting device adjacent the spray with the light emitter and light detector oriented at the spray.

3. A spray system as in claim 2, wherein the mounting device includes means for adjusting a position of the flow sensor relative to the spray.

4. A spray system as in claim 1, wherein the light emitter is a light-emitting diode.

5. A spray system as in claim 1, wherein the light detector is a phototransistor.

6. A spray system as in claim 1, wherein the flow sensor is at a location remote from the spray, and the spray system further includes a first optical filter coupling for transmitting light generated by the light emitter to form the light beam directed at the reflective surface of the spray, and a second optical filter coupling for transmitting the reflected light beam to the light detector for detection thereof.

7. A spray system as in claim 1, wherein the spray is of a hollow conical shape.

8. A spray system as in claim 1, wherein the spray is of a fan shape.

9. A spray system as in claim 1, wherein the spray is a stream.

10. A spray system as in claim 1 in which said spray device has a liquid discharge nozzle from which a discharging spray is emitted, and said light emitter is oriented for directing said light beam to a reflective surface of the spray at a location adjacent a discharge end of said nozzle.

11. A spray system as in claim 1 including a system controller responsive to flow detection signals from said sensor for determining whether the spray is properly oriented.

12. A method of detection a spray generated by a spray device, comprising:
    directing a liquid spray from the spray device into an open environment,
    directing a light beam at a reflective surface of the spray while the spray is in the open environment prior to impacting an article or other surface to cause creation of a reflected light beam;
    detecting the reflected light beam and not the light from the directed light beam that is not reflected; and
    generating a flow detection signal indicating a presence of the spray based upon the detected reflected light beam.

13. A method as in claim 12, wherein the light beam is generated by a light emitter, and the reflected light beam is detected by a light detector, and the method further comprising aligning the light emitter and the light detector with respect to the spray such that the light detector receives the reflected light beam.

14. A method as in claim 12 including directing said light beam to a reflective surface of the spray at a location adjacent a discharge end of the spray device.

15. A method as in claim 12 including determining from the flow detection signal whether the spray is directed from the spray device in proper orientation.

16. A spray system comprising:
   a spray device for generating a spray of liquid; and
   a flow sensor having a light emitter and a light detector, the flow sensor being disposed such that a light beam generated by the light emitter is directed at a reflective surface of the spray to create a reflected light beam directed for detection by the light detector, the flow sensor generating a flow detection signal indicating a presence of the spray when the light detector detects the reflected light beam,
   a system controller;
   a gate signal generator for generating a gate signal indicative of on-off states of the spray device, and
   said system controller receiving the flow detection signal and the gate signal and determining from the gate signal and flow detection signal whether the spray device is operating properly.

17. A spray system as in claim 16, wherein the gate signal generator includes a current sensor for detecting a current for operating the spray device.

18. A spray system as in claim 16, wherein the system controller is programmed to generate an alarm signal when it determines that the spray device is not operating properly.

19. A method of detection a spray generated by a spray device, comprising:
   directing a light beam at a reflective surface of the spray to cause creation of a reflected light beam;
   detecting the reflected light beam;
   generating a flow detection signal indicating a presence of the spray;
   generating a gate signal indicative of on-off states of the spray device; and
   determining from the gate signal and the flow sensing signal whether the spray device is operating properly.

20. A method as in claim 19, further comprising:
   generating an alarm signal when the determining step determines that the spray device is not operating properly.

21. A method as in claim 19, whether step of generating a gate signal includes sensing a current for operating the spray device.

* * * * *